May 24, 1938.  V. A. BARY  2,118,138

LUBRICATED AXLE BEARING

Filed March 15, 1934

Inventor:

Victor Alexander Bary

Patented May 24, 1938

2,118,138

UNITED STATES PATENT OFFICE 2,118,138

LUBRICATED AXLE BEARING

Victor Alexander Bary, London, England

Application March 15, 1934, Serial No. 715,651
In Germany March 16, 1933

8 Claims. (Cl. 308—85)

The problem of feeding maximum quantities of lubricant to axle journals, more especially those in axle boxes of rail vehicles, by formation of an uninterrupted endless film of lubricant has been attempted in a multitude of ways. Whilst originally so-called lubricating cushions or pads were provided below the axle journal for the purpose of drawing up lubricant with the aid of the capillary force developing in pads of that description, mechanical feeding means were adopted later which ensured the distribution or feeding of practically any quantity of lubricant. Lubricant was fed to the axle journal by retaining oil in grooves provided for the purpose in the running surface of the liners. When the technique began to introduce the principle of interchangeability of parts in the construction of rail vehicles, other methods of lubricating were adopted, for example devices causing the oil to drip on to the axle journal, forced lubrication or another method employed the lower half-liner for lubricating purposes by providing tapering admission grooves to which the lubricant was fed. Any of these methods appears relatively complicated in contradistinction to the simple possibility of providing the running surface of the axle journal with an oil film by causing the axle journal to run in some device shaped like a bath, as by this means the theoretical maximum of lubricant would be fed to the axle journal without danger of any part of the running surface of the axle journal lacking lubrication. All special measures to cause dripping, spurting or creating an oil film by means of the lower half-liner and the special constructions for realizing these measures are dispensable.

The realization of this idea meets, however, with untold difficulties. Considering the design usually employed in the construction of axles for rail vehicles one finds no possibility for a bath-shaped oil collecting device below the axle journal through which the axle journal could be turned, as the lower vertex of the packing ring between axle box housing and axle would of necessity be always below this lubricant collecting device. As the axle journal executes certain movements in the direction of the axle box housing, there is, according to the present stand of the technique, no possibility for providing and keeping in running order any such bath-shaped oil collecting device with a level above the lower vertex of the packing ring in spite of the movements which the axle journal makes in the direction of the axle housing. It has been attempted to avoid or overcome these difficulties by increasing the diameter of the running surface, that is to say of the contact surface between axle journal and liner by so much as to place the lower vertex of the running surface below the lower vertex of the packing. To realize these conditions, however, an exceptional increase of the diameter of the axle journal is required to ensure the surface of the reinforcement bush dipping into the oil-bath. A number of disadvantages are caused thereby. In the first instance, the frictional torque is increased so considerably that a multiple of the ordinarily necessary starting tractive power is required for vehicles equipped with axle boxes of that description, and, further, there is a considerable increase of elastically non-supported masses. As, for safety reasons, the reinforcement must be shrunk-on to the axle journal, the mounting and dismantling of such axle boxes either causes fitting difficulties to an unbearable extent or special constructions of the axle box must be resorted to whereby the simplicity of construction otherwise possible with this lubricating method is completely lost. For above reasons, proposals of this description were formerly not realized in a practical way.

Thus the object of this present invention is clearly outlined. It aims at the realization of the afore-mentioned, with regard to simplicity and running safety as yet unattained, method of lubrication, without having to put up with the disadvantages of known proposals put forward for the solution of the problem. The method as proposed in accordance with the nature of the present invention comprises the storing or collecting of lubricant between axle journal and oil sump and the transmitting of lubricant from this bath-like oil collecting device to the running surface of the axle journal which is moistened with lubricant by turning it through or causing it to rotate in this bath-like oil store respectively. There is in contradistinction to former proposals no direct feeding of the lubricant from the oil sump to the axle journal or its reinforcement bush respectively, but, somewhere between axle journal and oil sump a second, special, bath-like collecting device for lubricant is provided through which the axle journal may be turned without any difficulty whatsoever. Thus it becomes possible to employ the usual type of axle journal or journals with but slightly increased diameter, eliminating the disadvantages resulting from considerable increases. This special store of lubricant arranged between oil sump and journal is preferably formed by providing a tray between axle journal and oil sump wherein a portion of the journal is received. The lubricant supply to the tray can be effected in any desired manner. The feeding of lubricant to the tray becomes much simplified by the employment of mechanical feeding devices which rotate in conjunction with the axle journal and dip into the oil sump.

The devices serving for the performance of this novel lubricating method may be much varied as regards their construction. Their principal feature comprises the arranging of a tray between oil sump and axle journal, so as to receive a portion of the axle journal, and, in a combination, self-feeding devices for keeping afore-mentioned tray supplied with lubricant. If the walls of the tray positioned in planes vertical to the axis of the journal are raised above the lower vertex of the axle journal surface towards the centre of the axle journal, it becomes possible without any trouble whatever to arrange the oil tray at a shorter distance to the journal centre than the distance of the lower vertex of the axle packing within the axle box housing. The wall of the tray at the neck end of the journal finds sufficient room if the axle neck is made to taper towards the journal. That portion of the axle journal which is received in the oil tray is suitably formed entirely or partly by a reinforcement of the axle journal, for example comprising a shrunk-on bush, made from hardened steel by preference. The tray itself may be constructed as a separate part of the axle box shell or housing, the latter made in two parts by preference. The liner which supports the axle journal, suitably of the ring-shaped type, may also be received with its lower vertex in the oil tray, in which case the admission of lubricant to the flooding spaces between the axle journal and its liner is facilitated by the arrangement of holes drilled through the liner. To safeguard the liner against circumferential displacement within the axle box housing, the liner is provided with guide lips which fit into corresponding recesses arranged in those parts of the axle box which form the oil tray. For safeguarding against end- or axial thrusts in the axle journal thrust rings which absorb axial thrusts are fitted between the vertical surfaces of the liner and the axle box housing. The inner diameter of these rings is less than that of the running surface between axle journal and liner. These rings may also be secured against circumferential displacement by providing recesses for the reception of the guide lips of the liner.

The mechanical devices for supplying the oil tray with lubricant are of a very special construction. The sole portion of the self-feeder belongs to a cylinder jacket area around the axle journal, whilst projections extending from this sole portion into planes vertical to the journal axis point towards the latter. These projections have end points nearest to the journal axis and these various points may be staggered in their relation to one another, of course in the direction of rotation. A feeding device of this description provides feeding possibilities at any circumferential speed: oil dripping from the feeding head on to oil catching organs jutting into the ring space through which the feeding device travels; feeding lubricant in the form of threads laid across the catching organs; throwing lubricant against the wall of the axle box housing; returning lubricant to the catching devices—without requiring the formerly necessary bending at sharp angles of the feeding device. This bending necessitated lowest points of the feeding heads towards their vicinity from which lubricant could drip or be transformed into threads. Further, by sharply bending these feeding organs comparatively severe stresses on the material are caused, whilst feeding devices produced by casting etc. require special machining in order to attain a sharp edge. The present novel way of constructing the feeding device attains the same effects without having to put up with the disadvantages resulting from sharp angles.

On account of the considerably increased speed of the lubricant circulation an absolutely oil-tight joint between axle box cover and axle box housing is essential. For its accomplishment, tapering surfaces on both parts are in contact with one another which belong by preference to tongued and grooved portions of axle box housing and cover.

The accompanying drawing shows by way of example one of the manners in which the present invention may be performed.

Figure 1:
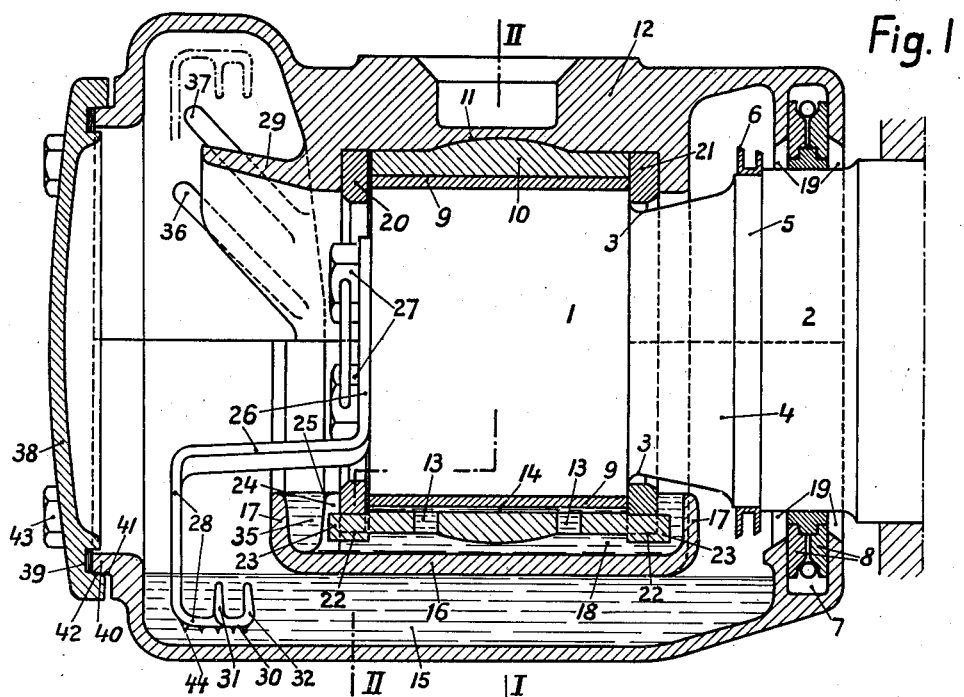
Figure 1 represents a vertical sectional view over the line I—I of Fig. 2 of an axle box constructed in accordance with the nature of the present invention.

In both figures is 1 the axle journal, 2 the axle shoulder, joined to journal 1 by means of tapering neck 4 which has its smallest diameter at 3. A special rim 5 recessed from shoulder 2 carries splash ring or collar 6 usually provided in axle boxes with accelerated oil circulation. Recess 7 serves for the reception of a particularly effective dust packing 8. Axle journal 1 is reinforced by steel bush 9 and supported in liner 10 made from any of the usually employed friction metals, the liner being of the solid ring type. Arched portion 11 of liner 10 ensures the possibility of self-adjustment of the supported parts in their relation to the axle box housing. Liner 10 is provided with holes 13 drilled through its lower portion for facilitating the entrance of lubricant into the crescent-shaped flooding space 14 between axle journal 1 or reinforcement bush 9 respectively and liner 10.

In accordance with the nature of the present invention tray 16 is provided between axle journal 1 and oil sump 15. In the present example said tray is shown solid with axle box housing 12. Walls 17 of tray 16 arranged vertically to the journal axis have been raised above the lower vertex of bush 9 or above the lower vertex of the running surface of liner 10 respectively towards the axle journal centre. Wall 17 on the neck end of the journal is placed in the room freed by tapering neck 4 down to the smallest diameter shown at 3. As lubricant may be collected or retained within tray 16 in a manner which will be explained presently it will be seen that the entire lower portion of axle journal 1 or its reinforcement bush 9 rests in oil bath 18 through which it turns while running. The entire running surface of axle journal 1 or its reinforcement bush 9 respectively can thus be supplied with a theoretical maximum of lubricant, thereby ensuring the formation of an endless film of lubricant. It will also be seen that the upper level of oil bath 18 is above the lower vertex of recess 19 provided in axle box housing 12 for the reception of packing 8, and, consequently, the frictional torque of the axle box is but slightly increased in contradistinction to the usual type of construction.

Thrust rings 20 and 21 serve for the purpose of securing the axle journal against axial movements. These thrust rings are provided at their lower vertex with recesses 22 for the reception of guide lips 23 with which liner 10 is provided in axial direction. These guide lips 23 in their turn rest in recesses 24 of oil tray 16, thus protecting liner 10 and thrust rings 20 and 21 from circumferential displacement. In the present example guide lip 23 pointing towards the cover end of the axle box is shown to extend into recess 24 of transversal rib 25 in tray 16 whilst guide lip 23 at the shoulder end projects merely through thrust ring 21 where recessed at 22.

Figure 2:
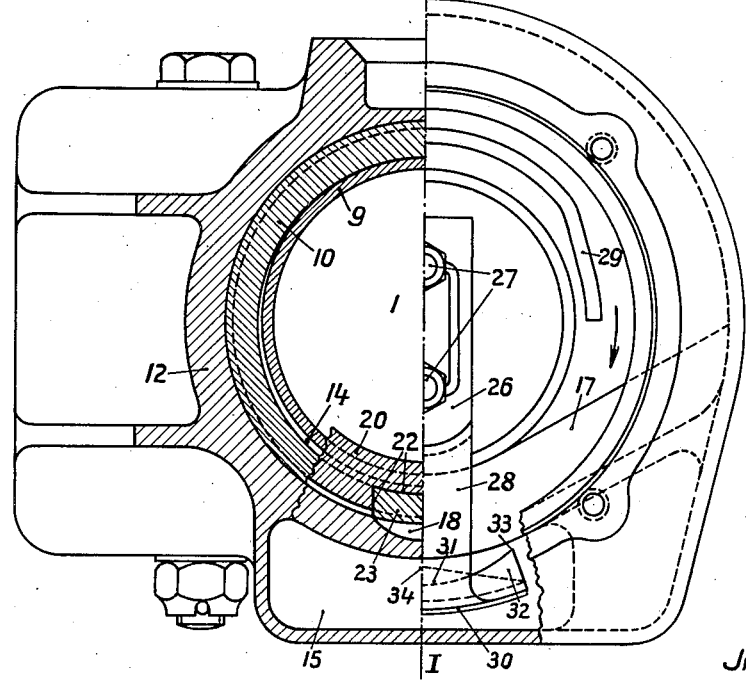
Figure 2 shows with its left hand portion a vertical section of the axle box over the line II—II of Fig. 1, whilst the right hand portion represents an end view of the axle box with the cover removed.

Lubricant is supplied to tray 16 with the aid of feeding device 26 firmly attached to axle journal 1 at 27 and, consequently, rotating with the latter. This feeding device is sharply bent at 28, in order to provide room within its travelling area for oil catch projections 29 jutting out from axle box housing 12. Centrifugal blade 30 of the self-feeder belongs to a cylinder jacket area around the axle journal, whilst projections 31 and 32, in a vertical plane to the axle journal, point towards the centre of the journal. Each of aforementioned projections is equipped with end points 33 and 34 respectively which are particularly near the axle journal, and it will be seen from Fig. 2 that these various end points are staggered in their position to one another. Parallel ribs 34 arranged in the direction of rotation facilitate the oil discharge. By means of this arrangement a uniform and permanent dripping of lubricant on to oil catch projection 29 is ensured, or threads of lubricant are formed and laid across said catching projection respectively. The lubricant intercepted by oil catching projection 29 flows from there to trough 35 forming part of oil tray 16. With higher speeds, the lubricant is thrown by the centrifuge on to ribs 36 and 37 provided within axle box housing 12 from where it also flows to trough 35. Any lubricant fed in excess overflows the upper edge of the walls of the oil tray and returns to oil sump 15.

The shown example is, however, subject, to a great variety of constructional forms, all of which may serve for performing this novel and peculiar method of lubrication and be in accordance with the nature of this present invention. Oil tray 16, for example, may also be constructed as a separate part of the axle box housing. Further, the reinforcement bush 9 of the axle journal is of no fundamental importance, the axle journal itself may equally well serve as running surface. Further, the example of a feeding device for supplying lubricant to oil tray 16 as shown in the drawing is in no way an integral part of this present invention.

For accomplishing an oil-tight joint between axle box cover 38 and axle box housing 12, a spring ring-shaped rim 40 of axle box housing 12 juts into the groove 39 of axle box cover 38. This rim is tapered at 41 and is in contact with a similarly tapering surface 42 of groove 39. As axle box cover 38 may be tightly screwed down on to the axle box housing by means of bolts 43, an absolutely oil-tight joint is accomplished between axle box cover and housing.

Having now described in detail the nature of this present invention and shown by way of example and accompanying drawing the manner in which it may be performed

I claim:—

1. Axle bearing with mechanical oil feeding means, especially for rail vehicles, comprising in combination an axle journal, an axle box housing the diameter of the running surface of said axle journal being less than the diameter which the said axle journal has in the region of the packing against the axle box housing, a bearing brass for receiving the axle journal, a lubricant storage tank in the lower part of the axle box housing, a tray formed with the axle box housing and arranged between the axle journal and the lubricant storage tank and receiving in its hollow space the lower part of the axle journal in the axle box housing, the lower vertex of the front walls of the tray on both sides being located nearer the axis of the axle journal than the lower vertex of the running surface of the axle journal, the tops of all of the walls extending nearer the axle axis than the lowest line of the axle journal, feeding means adapted to feed lubricant from the lubricant storage tank into the tray.

2. Axle bearing according to claim 1, the said tray forming a part of the axle box housing.

3. Axle bearing according to claim 1, in which the bearing brass is constructed in a hollow cylindrical form and is received with its lower vertex in the said tray, transverse holes in the said lower vertex of the hollow cylindrical bearing brass adapted to feed lubricant from the tray to a crescent-shaped entrance space formed between axle journal and bearing brass.

4. Axle bearing according to claim 1, in which the bearing brass is constructed in a hollow cylindrical form and is received with its lower vertex in the said tray, means for feeding lubricant from the tray around the running surface between axle journal and the said bearing brass, lip-shaped extensions on the said lower vertex of the bearing brass, recesses in fixed parts of the tray adapted to receive the lip-shaped extensions and to safeguard the bearing brass against displacement.

5. Axle bearing according to claim 1, in which the bearing brass is constructed in a hollow cylindrical form and is received with its lower vertex in the said tray, means for feeding lubricant from the tray around the running surface between axle journal and the said bearing brass, transverse ribs on the said tray, recesses of said transverse ribs adapted to receive the lip-shaped extensions of the bearing brass and to safeguard the bearing brass against displacement.

6. Axle bearing according to claim 1, in which the bearing brass is constructed in a hollow cylindrical form and is received with its lower vertex in the said tray, means for feeding lubricant from the tray around the running surface between axle journal and the said bearing brass, lip-shaped extensions on the said lower vertex of the bearing brass, thrust rings between the end faces of the bearing brass and the axle box housing, the inside diameter of the said rings being smaller than the diameter of the running surface, recesses in the said rings for receiving the lip-shaped extensions of the bearing brass being adapted to safeguard the rings against displacement.

7. Axle bearing according to claim 1, in which the bearing brass is constructed in a hollow cylindrical form and is received with its lower vertex in the said tray, means for feeding lubricant from the tray around the running surface be-tweeen axle journal and the said bearing brass, lip-shaped extensions on the said lower vertex of the bearing brass, recesses in fixed parts of the tray adapted to receive the lip-shaped extensions and to safeguard the bearing brass against displacement, thrust rings between the end faces of the bearing brass and the axle box housing, the inside diameter of the said rings being smaller than the diameter of the running surface and recesses in the said rings for receiving the said lip-shaped extensions.

8. Axle bearing according to claim 1, in which the bearing brass is of hollow cylindrical formation and is arranged in the housing, the axle journal being received in the hollow space of said bearing brass, said bearing brass being received with its lower vertex in the said tray, and the feeding means for the lubricant acting to direct the lubricant from the tray around the running surface between the axle journal and the bearing brass.

VICTOR ALEXANDER BARY.